United States Patent
Sato et al.

(10) Patent No.: US 8,516,275 B2
(45) Date of Patent: *Aug. 20, 2013

(54) DATA STRUCTURE OF MULTIMEDIA FILE FORMAT, ENCRYPTING METHOD AND DEVICE THEREOF, AND DECRYPTING METHOD AND DEVICE THEREOF

(75) Inventors: Jun Sato, Kawasaki (JP); Toru Terauchi, Tokyo (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 13/484,421

(22) Filed: May 31, 2012

(65) Prior Publication Data

US 2012/0237026 A1  Sep. 20, 2012

Related U.S. Application Data

(62) Division of application No. 10/400,635, filed on Mar. 28, 2003, now Pat. No. 8,214,655.

(30) Foreign Application Priority Data

Mar. 29, 2002  (JP) ................................ 2002-097757

(51) Int. Cl.
*H04L 29/06* (2006.01)
(52) U.S. Cl.
USPC ......................................... 713/193; 380/269
(58) Field of Classification Search
None
See application file for complete search history.

(56) References Cited

U.S. PATENT DOCUMENTS

| | | | |
|---|---|---|---|
| 4,962,498 A | 10/1990 | May, Jr. | |
| 5,506,904 A | 4/1996 | Sheldrick et al. | |
| 5,548,648 A * | 8/1996 | Yorke-Smith | ................. 713/193 |
| 5,574,905 A | 11/1996 | DeCarmo | |
| 5,812,663 A | 9/1998 | Akiyama et al. | |
| 6,065,050 A | 5/2000 | DeMoney | |
| 6,079,566 A | 6/2000 | Eleftheriadis et al. | |
| 6,157,719 A | 12/2000 | Wasilewski et al. | |
| 6,230,162 B1 | 5/2001 | Kumar et al. | |
| 6,356,921 B1 | 3/2002 | Kumar et al. | |
| 6,460,097 B1 | 10/2002 | Harumoto et al. | |

(Continued)

FOREIGN PATENT DOCUMENTS

| | | |
|---|---|---|
| JP | 2001-197120 | 7/2001 |
| JP | 2001-351324 | 12/2001 |

OTHER PUBLICATIONS

"MPEG-4", Wikipedia contributors, published by Wikipedia, The Free Encyclopedia, date of last revision Feb. 9, 2011, http://en.wikipedia.org/w/index.php?title=MPEG-4&oldid=412880001, pp. 1-13.

*Primary Examiner* — Hadi Armouche
(74) *Attorney, Agent, or Firm* — Oblon, Spivak, McClelland, Maier & Neustadt, L.L.P.

(57) ABSTRACT

In a data structure of a multimedia file format, a movie box and a media data box are provided. In each box, a non-encrypted size field, a non-encrypted type field and box data field are provided. In box data of the movie box, information data regarding multimedia data is stored. The multimedia data is encrypted and stored in box data of the media data box. The information data is obtained by referring to the container in the movie box. This information data is held as encryption and encoding information data. By referring to the information data, a data unit of the encrypted multimedia data in the media data box is obtained, and the unit data is decrypted.

8 Claims, 10 Drawing Sheets

(56) References Cited

U.S. PATENT DOCUMENTS

| | | |
|---|---|---|
| 6,512,778 B1 | 1/2003 | Jones et al. |
| 6,693,649 B1 | 2/2004 | Lipscomb et al. |
| 6,697,817 B2 | 2/2004 | Muraoka |
| 6,735,311 B1 | 5/2004 | Rump et al. |
| 6,751,623 B1 | 6/2004 | Basso et al. |
| 6,819,394 B1 | 11/2004 | Nomura et al. |
| 6,871,205 B1 | 3/2005 | Yamada et al. |
| 2002/0069218 A1 | 6/2002 | Sull et al. |
| 2003/0095664 A1 | 5/2003 | Asano et al. |
| 2004/0075678 A1 | 4/2004 | Kazui et al. |

\* cited by examiner

| Bit<br>Byte | 7 | 6 | 5 | 4 | 3 | 2 | 1 | 0 |
|---|---|---|---|---|---|---|---|---|
| 0 | \multicolumn{8}{c|}{} |
| 1 | \multicolumn{8}{c|}{Size field (not encrypted)} |
| 2 | \multicolumn{8}{c|}{In case of size (Size==1)} |
| 3 | | | | | | | | |
| 4 | | | | | | | | |
| 5 | \multicolumn{8}{c|}{Type field (not encrypted)} |
| 6 | | | | | | | | |
| 7 | | | | | | | | |
| 8 | | | | | | | | |
| 9 | | | | | | | | |
| 10 | | | | | | | | |
| 11 | | | | | | | | |
| 12 | \multicolumn{8}{c|}{Large size field (not encrypted)} |
| 13 | | | | | | | | |
| 14 | | | | | | | | |
| 15 | | | | | | | | |
| 16 | | | | | | | | |
| 17 | | | | | | | | |
| 18 | | | | | | | | |
|  | \multicolumn{8}{c|}{Box data field (encrypted)} |
| N+6 | | | | | | | | |

FIG. 5

| Bit Byte | 7 | 6 | 5 | 4 | 3 | 2 | 1 | 0 |
|---|---|---|---|---|---|---|---|---|
| 0 | | | | | | | | |
| 1 | Size field (not encrypted) | | | | | | | |
| 2 | In case of size (Size!=1) | | | | | | | |
| 3 | | | | | | | | |
| 4 | | | | | | | | |
| 5 | Type field (not encrypted) | | | | | | | |
| 6 | | | | | | | | |
| 7 | | | | | | | | |
| 8 | | | | | | | | |
| 9 | | | | | | | | |
| | Box data field (encrypted) | | | | | | | |
| | Residual block of box data (not encrypted) | | | | | | | |

F I G. 6

| Bit Byte | 7 | 6 | 5 | 4 | 3 | 2 | 1 | 0 |
|---|---|---|---|---|---|---|---|---|
| 0 | | | | | | | | |
| 1 | Size field (not encrypted) | | | | | | | |
| 2 | | | | | | | | |
| 3 | | | | | | | | |
| 4 | | | | | | | | |
| 5 | Type field (not encrypted) | | | | | | | |
| 6 | | | | | | | | |
| 7 | | | | | | | | |
| 8 | | | | | | | | |
| 9 | | | | | | | | |
| 10 | | | | | | | | |
| 11 | Large size field | | | | | | | |
| 12 | [in case size=1 is described in size field] | | | | | | | |
| 13 | (not encrypted) | | | | | | | |
| 14 | | | | | | | | |
| 15 | | | | | | | | |
| | Box data field (encrypted) | | | | | | | |

F I G. 7

| First layer | Second layer | Third layer | Fourth layer | Fifth layer | Sixth layer | |
|---|---|---|---|---|---|---|
| ftyp (File type Box) | | | | | | ~11 |
| moov (Movie Box) | | | | | | ~12 |
| | mvhd (Movie Header Box) | | | | | |
| | iods (Object Descriptor Box) | | | | | |
| | track (Track Box) | | | | | |
| | | tkhd (Track Header Box) | | | | |
| | | tref (Track Reference Box) | | | | |
| | | edts (Edit Box) | | | | |
| | | | elst (Edit List Box) | | | |
| | | mdia (Media Box) | | | | |
| | | | mdhd (Media Header Box) | | | |
| | | | hdlr (Hondler Reference Box) | | | |
| | | | minf (Media Information Box) | | | |
| | | | | vmhd (Video Media Header Box) | | |
| | | | | smhd (Sound Media Header Box) | | |
| | | | | hmhd (Hint Media Header Box) | | |
| | | | | (mpeg) (MPEG4 Media Header Box) | | |
| | | | | dinf (Data Information Box) | | |
| | | | | | dref (Data Reference Box) | |
| | | | | stbl (Sample Table Box) | | |
| | | | | | stts (Decdsling Time to Sample Box) | |
| | | | | | ctts (Composition Time to Sample Box) | |
| | | | | | stss (Sync Sample Box) | |
| | | | | | stsd (Sample Description Box) | |
| | | | | | stsz (Sample Size Box) | |
| | | | | | stsc (Sample to Chunk Box) | |
| | | | | | stco (Chunk Offset Box) | |
| | | | | | stsh (Shadow Sync Sample Box) | |
| | | | | | stdp (Degradation Priority Box) | |
| mdat (Media Data Box) | | | | | | ~13 |
| moof (Movie Fragment Box) | | | | | | ~14 |
| free (Free Space Box) | | | | | | ~15 |
| skip (Free Space Box) | | | | | | ~16 |
| udta (Uster-Data Box) | | | | | | ~17 |

FIG. 8

| mdat (Media Data Box) | ~13 |
| --- | --- |
| moov (Movie Box) | ~12 |
| free (Free Space Box) | ~15 |
| skip (Skip Space Box) | ~16 |
| udata (User Data Box) | ~17 |

| moov (Movie Box) | ~12 |
| --- | --- |
| udata (User Data Box) | ~17 |
| mdat (Media Data Box) | ~13 |
| moov (Movie Box) | ~12 |
| mdat (Media Data Box) | ~13 |
| skip (Skip Space Box) | ~16 |
| free (Free Space Box) | ~15 |

| Bit Byte | 7 | 6 | 5 | 4 | 3 | 2 | 1 | 0 |
|---|---|---|---|---|---|---|---|---|
| 0 | | | | | | | | |
| 1 | | | | | | | | |
| | Sample is within chunk range (encrypted) | | | | | | | |
| N-1 | | | | | | | | |
| N | | | | | | | | |

FIG. 14

| Bit Byte | 7 | 6 | 5 | 4 | 3 | 2 | 1 | 0 |
|---|---|---|---|---|---|---|---|---|
| 0 | | | | | | | | |
| 1 | | | | | | | | |
| 2 | Sample range is encrypted portion of chunk | | | | | | | |
| 8*n | | | | | | | | |
| | | | | | | | | |
| N-1 | Sample range is non-encrypted portion of chunk | | | | | | | |
| N | | | | | | | | |

FIG. 15

| Bit Byte | 7 | 6 | 5 | 4 | 3 | 2 | 1 | 0 |
|---|---|---|---|---|---|---|---|---|
| 0 | | | | | | | | |
| 1 | | | | | | | | |
| | Sample(Not Encrypted) | | | | | | | |
| N | | | | | | | | |

FIG. 16

DATA STRUCTURE OF MULTIMEDIA FILE FORMAT, ENCRYPTING METHOD AND DEVICE THEREOF, AND DECRYPTING METHOD AND DEVICE THEREOF

CROSS-REFERENCE TO RELATED APPLICATIONS

This application is a divisional of U.S. application Ser. No. 10/400,635 filed Mar. 28, 2003, and is based upon and claims the benefit of priority from the prior Japanese Patent Application No. 2002-097757, filed Mar. 29, 2002, the entire contents of each of which are incorporated herein by reference.

BACKGROUND OF THE INVENTION

1. Field of the Invention

The present invention relates to a data structure of a multimedia file format, an encrypting method and an encrypting device thereof, and a decrypting method and a decrypting device thereof. More particularly, it relates to an encrypting method and an encrypting device of moving picture files in a moving picture recorder and a reproducing device equipped with memory cards.

2. Description of the Related Art

In recent years, a morphology of contents such as moving pictures has transferred from analog data to digital data. The digitized contents can be copied without any deterioration of quality. Accordingly, content data can be copied through a CD-R, a recordable DVD disk or a memory card between users, alternatively by a file transfer technology utilizing communication network such as Internet, for example, by sending the content data attached to E mail. Such a copy operation has become rampant, which brings about problems of copyright in a content business world.

As a technique for protecting the copyright of the digital contents, there is a method for encrypting the content data. By this encryption, illegal copy can be prevented. In the conventional case of encrypting the content data, a method for sweepingly encrypting the content data en block from head to end has generally been employed. Therefore, only those who have rights to use the data content, i.e., rights to decrypt the content data, can use the content data.

In the aforementioned conventional encrypting method, when the content data is encrypted en block from head to end, it is possible to prevent the illegal copy. However, since the content data is encrypted en block from head to end, it is not easy to access an optional position of the content data. To access the optional position, even a code of data not targeted for accessing must be decrypted. In practice, therefore, there is a problem of a useless processing requirement. That is, conventionally, accessing to the optional position of the encrypted content data requires processing for sequentially decrypting codes from the head of the content, which is carried out until a desired content position is reached. Such processing has a problem of a long processing time until data of the access position is obtained.

The processing of decrypting the codes until the desired content position is reached is necessary only for accessing a desired position, but not for actually using the content data. Thus, it can be said that it is useless processing.

As a desired access position is more apart from the head of the file, the aforementioned useless processing and the processing time are increased. Since the increases of a processing load and the processing time are accompanied by a power consumption increase, a portable equipment or the like using a battery has a problem of a reduction in continuous use time.

The accessing to the optional position of the content data is necessary for realizing, for example fast-forward reproduction, rewind reproduction, random access reproduction, and resume reproduction (function of resuming from where reproduction is stopped by a user) in reproduction of moving pictures.

BRIEF SUMMARY OF THE INVENTION

Objects of the present invention are to provide a data structure of a multimedia file format which enables efficient access to a predetermined position of content data, an encrypting method thereof, and a decrypting method thereof.

According to the present invention, there is provided a data structure of a multimedia file format comprising:

a first box having first encrypted box data which stores a first non-encrypted size field to indicate a size of the first box by bytes, a first non-encrypted type field to identify a type of the first box, and encrypted multimedia data; and a second box having second encrypted box data which stores a second non-encrypted size field to indicate a size of the second box by bytes, a second non-encrypted type field to identify a type of the second box, and encrypted information data regarding multimedia data stored in the second box data.

Furthermore, according to the present invention, there is provided a method of encrypting a multimedia file having a file format structure comprising a first box having first box data which stores a first size field to indicate a size of the first box by bytes, a first type field to identify a type of the first box, and multimedia data, and a second box having second box data which stores a second size field to indicate a size of the second box by bytes, a second type field to identify a type of the second box, and information data regarding multimedia data stored in the second box data, the method comprising:

encrypting the multimedia data to be stored in the first box data and storing the encrypted multimedia data in the first box data;

encrypting the information data to be stored in the second box data and storing the encrypted information data in the second box data; and storing the first and second size fields and the first and second type fields in corresponding boxes without encryption.

Furthermore, according to the present invention, there is provided a device to encrypt a multimedia file having a file format structure comprising a first box having first box data which stores a first size field to indicate a size of the first box by bytes, a first type field to identify a type of the first box, and multimedia data; and a second box having second box data which stores a second size field to indicate a size of the second box by bytes, a second type field to identify a type of the second box, and information data regarding multimedia data stored in the second box data, the device comprising:

an encryption section which encrypts the multimedia data to be stored in the first box data to store the encrypted multimedia data in the first box data and which encrypts the information data to be stored in the second box data to store the encrypted information data in the second box data; and a file generation section to store the first and second size fields and the first and second type fields in corresponding boxes without encryption.

Furthermore, according to the present invention, there is provided a method of decrypting a multimedia file having a file format structure comprising a first box having first encrypted box data which stores a first non-encrypted size field to indicate a size of the first box by bytes, a first non-encrypted type field to identify a type of the first box, and encrypted multimedia data, and a second box having second encrypted box data which stores a second non-encrypted size field to indicate a size of the second box by bytes, a second non-encrypted type field to identify a type of the second box, and encrypted information data regarding multimedia data stored in the second box data, the method comprising:

decrypting the information data to be stored in the second box data and holding the decrypted information data as non-encrypted information data; and decrypting and outputting at least a part of the multimedia data stored in the first box data based on the non-encrypted information data.

Furthermore, according to the present invention, there is provided a device to decrypt a multimedia file having a file format structure comprising a first box having first encrypted box data which stores a first non-encrypted size field to indicate a size of the first box by bytes, a first non-encrypted type field to identify a type of the first box, and encrypted multimedia data, and a second box having second encrypted box data which stores a second non-encrypted size field to indicate a size of the second box by bytes, a second non-encrypted type field to identify a type of the second box, and encrypted information data regarding multimedia data stored in the second box data, the device comprising:

a decryption section which decrypts the information data to be stored in the second box data;

a storage section which stores the decrypted information data; and an output section which decrypts and outputs at least a part of the multimedia data stored in the first box data based on the non-encrypted information data.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate embodiments of the invention, and together with the general description given above and the detailed description of the embodiments given below, serve to explain the principles of the invention.

FIG. 5 is a plan view explaining encryption for a top-level box other than a media data box of another type different from the structure shown in FIG. 2.

FIG. 6 is a plan view explaining execution of the encryption by a block unit for the box shown in FIG. 4 and non-execution of encryption for residual data when it is generated.

FIG. 7 is a plan view showing a header structure of the media data box shown in FIG. 1 and non-encryption thereof.

FIG. 8 is a plan view showing a structure of a movie box shown in FIG. 1.

FIG. 14 is a plan view showing an example when the media data box shown in FIG. 1 is encrypted.

FIG. 15 is a plan view showing another example when the media data box shown in FIG. 1 is encrypted.

FIG. 16 is a plan view showing yet another example when the media data box shown in FIG. 1 is encrypted.

DETAILED DESCRIPTION OF THE INVENTION

Next, there will be described an encrypting method according to an embodiment of the present invention with reference to the accompanying drawings.

The encrypting method according to an embodiment of the present invention, which is applied to an MPEG-4 file format, will be described with reference to FIGS. 1 to 16.

Figure 1:
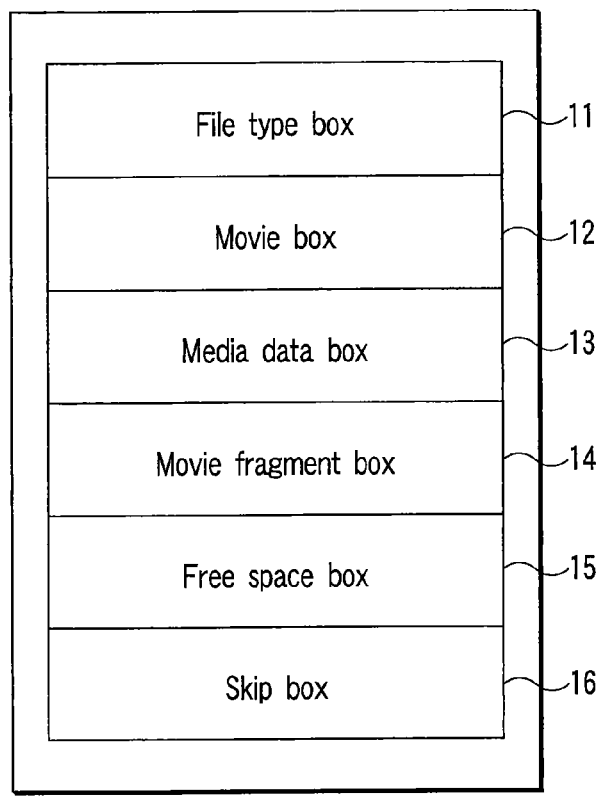
FIG. 1 is a plan view schematically showing a structure of an MP4 file to which an encrypting method of an embodiment of the present invention is applied.

FIG. 1 shows a structure of an MPEG-4 file format standardized in accordance with ISO. In the description hereinafter, the MPEG-4 file format is explained by being simply abbreviated to an MP4 file. The MP4 file is a file format for storing a video stream or an audio stream encoded in accordance with the MPEG-4. In this file format, other codec stream in addition to specifying on MPEG-4 standard can be also stored. The MP4 data may be stored as a file in a disk or as a binary image in a memory.

As shown in FIG. 1, the MP4 file has an object structure constituted of several boxes. It should be noted that the boxes may be referred to as atoms in some documents. In the MP4 file, storage can be carried out in a nested state where boxes are further inserted into the boxes. Here, a first of the boxes in the nested state which is a hierarchical structure, i.e., an uppermost box, is referred to as a top-level box. In FIG. 1, only the top-level box is shown.

As shown in FIG. 1, there are several types of top-level boxes. That is, the MP4 file is constituted of a file type box 11, a movie box 12, a media data box 13, a movie fragment box 14, a free space box 15, a skip box 16 etc. Some of these boxes are essential in the MP4 file, while others may be optionally described.

In the MP4, it is not necessary to array the boxes in an order similar to that shown in FIG. 1, and the constitution can be changed within a range of the foregoing defined items. Here, however, explanation will be omitted particularly regarding specific defined contents. However, a feature of the MP4 is that a number of the boxes having a same type, a position of the box and so on are specified in accordance with type of the box and constitutions of top-level boxes are varied in accordance with content data.

Now, a function of each top-level box will be described. The file type box stores a type of a file such as a brand or a version of the file, and describes the file set down by the MP4. The movie box 12 stores information or the like necessary for decoding metadata of the entire MP4 data, i.e., an encoded codec data stream of a media, for example information describing an attribute, an address or the like necessary for data decoding. The media data box 13 stores an actually encoded codec stream of a media, i.e., content data such as a video stream or an audio stream. The movie fragment box 14 stores the information of the movie box 12 in a divided manner. The free space box 15 and the skip box 16 store padding data for padding. The user data box 17 store user defied data.

Figure 2:
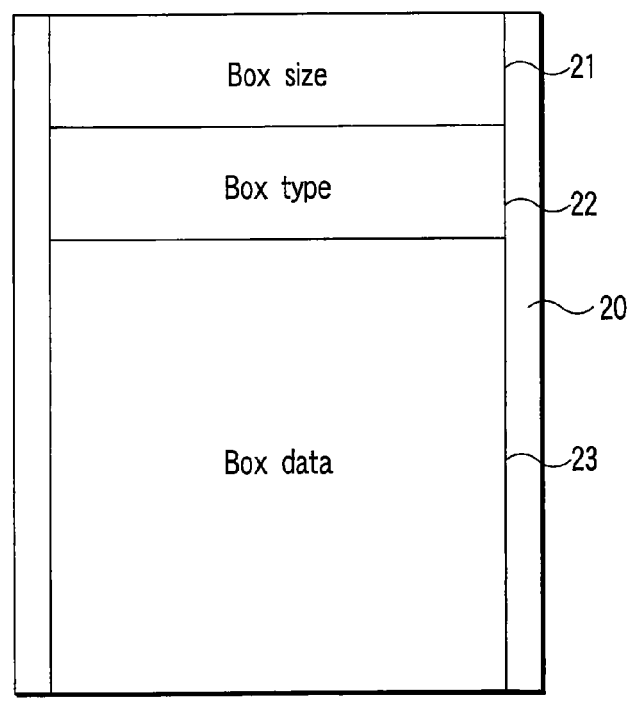
FIG. 2 is a plan view schematically showing a general structure of each box shown in FIG. 1.

Next, a box structure will be described. All the boxes have common structures. FIG. 2 shows a box 20 having a common structure. In the box 20, first 4 bytes are set in a size field 21 for indicating a size of a box by bytes. Next 4 bytes are set in a type field 22 for identifying a type of the box. The type of the box is identified by four characters. For example, "moov" is set in the case of the movie box 12, and "mdat" is set in the case of the movie data box. By matching these four characters, the type of the box can be identified. Then, after the type field 22, a box data field or section 23 is stored. A structure of this box data field has a syntax defined in each box in accordance with a purpose. A size of the box data field is set to a value obtained by subtracting 8 used in the size field 21 and the type field 22 from a value of the size field 21.

Figure 3:
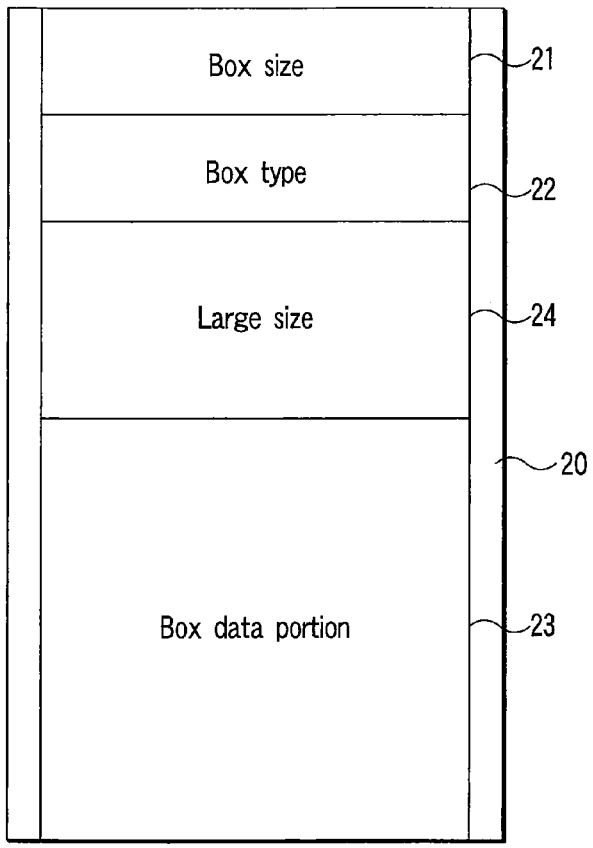
FIG. 3 is a plan view schematically showing a structure of a box of another type different from the structure shown in FIG. 2.

As shown in FIG. 3, when a value of the size field is 1 (Size=1), in this box 20, the size field 21 and a large size field 24 of 8 bytes indicating a size of a box appear between the type field 22 and the box data field 23 so that even a large capacity box which size cannot be represented by the size field 21 of 4 bytes can be dealt with. In this box 20, a size of the box data field 23 is set to a value obtained by subtracting 16 from a size stored in the large size field.

Figure 4:
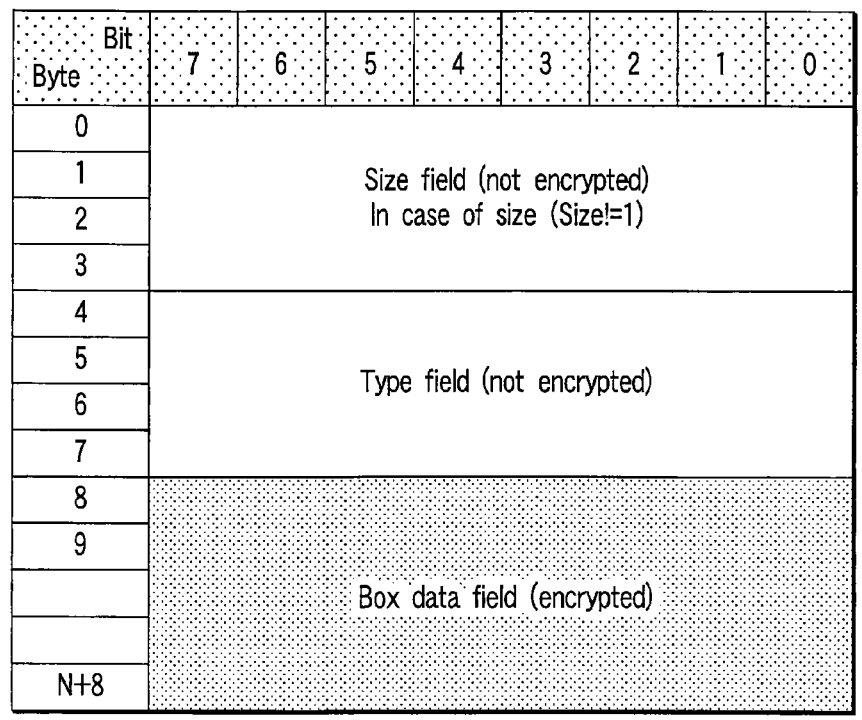
FIG. 4 is a plan view explaining encryption for a top-level box other than a media data box shown in FIG. 1.

According to the encrypting method of the embodiment of the present invention, data encryption or non-encryption is decided for each top-level box. That is, as shown in FIG. 4, if a value of the size field 24 is not 1 (size!=1), data of the size field and the type field are not encrypted (may be referred to as non-encryption if data is not simply encrypted, hereinafter), and the box data is targeted for encryption.

The media data in the media data box 13 are mandatory encrypted as described later. Box data in the other boxes 11, 12, 14, 15, 16 may be encrypted or not be encrypted as described later.

As shown in FIG. 5, even if a value of the size field 24 is 1 and the large size field 24 is present between the type field 22 and the box data field 23, this large size field 24 is not targeted for encryption, either. That is, according to the encrypting method of the embodiment of the present invention, only the box data in the box data field 23 is targeted for encryption. In a certain encrypting method, a block length of data may require a plurality of bytes. In other words, if data targeted for encryption is divided by a predetermined block length to be encrypted, residual data less than the predetermined block length is generated, creating a possibility that this data length will not reach the number of bytes necessary for encryption. If residual bytes are generated in the encrypted data, and the number of the bytes is smaller than the number of bytes targeted for encryption, as shown in FIG. 6, the residual data in this residual block may not be encrypted. An example is a case where a box data length is 15 bytes and an encrypting method needs 8 bytes for a block length of data. In this case, first 8 bytes of the box data are encrypted, while remaining 7 bytes are not.

As described above, by encrypting the data for the box data, for example when access is tried to the movie box 12, first 8 bytes of the MP4 data are first acquired to obtain a box size and a box type field. Then, checking is carried out on coincidence of the box type with a type of the movie box 12. In case of non-coincidence, that is, if the box type is not a type of the movie box 12, an access pointer is shifted by an amount equal to the box size, and next 8 bytes are acquired to obtain a box size and a box type field. This access pointer shifting is repeated until the box type coincides with the type of the movie box 12. When the box type coincides with the type of the movie box 12, the encrypted box data are sequentially decrypted to enable access to the box data in the movie box 12.

Next, encryption of media data in the media data box 13 will be described.

Different from the other top-level boxes which store information necessary for decoding media data streams, the media data box 13 stores media data. Encryption of this media data requires a capability of efficiently accessing an optional position of the media data during special reproduction such as skip reproduction, fast-forward reproduction, rewind reproduction or resume reproduction. Thus, as shown in FIG. 6, in addition to non-encryption of the size field and the type field, the stream data are subjected to encryption by each independent encoded unit. In this case, a sample or a frame is equivalent to the encoded unit for an audio stream, and a frame is equivalent to the encoded unit for a moving picture stream.

In the encryption of the media data in the media data box 13 of the embodiment of the present invention, for an encoded unit to be encrypted, a sample in the MP4 data is a target. Instead of the sample, a chunk may be encrypted in the media data box. A position of each sample in the MP4 data can be obtained by analyzing a chunk offset and a sample size of the movie box 12 describing the sample. That is, a position of the chunk to which the sample belongs is described as an offset from a head of a data file in the chunk offset, and a size of the sample included in the chunk is described in the sample size. Accordingly, offsets of all the samples can be obtained by referring to the chunk offset and the sample size.

To provide more clear explanation, description will be made of a structure of the movie box 12 and a data structure in the media data box 13 in the MP4 by referring to FIG. 8 to FIG. 10

Figures 9A, 9B, 12:
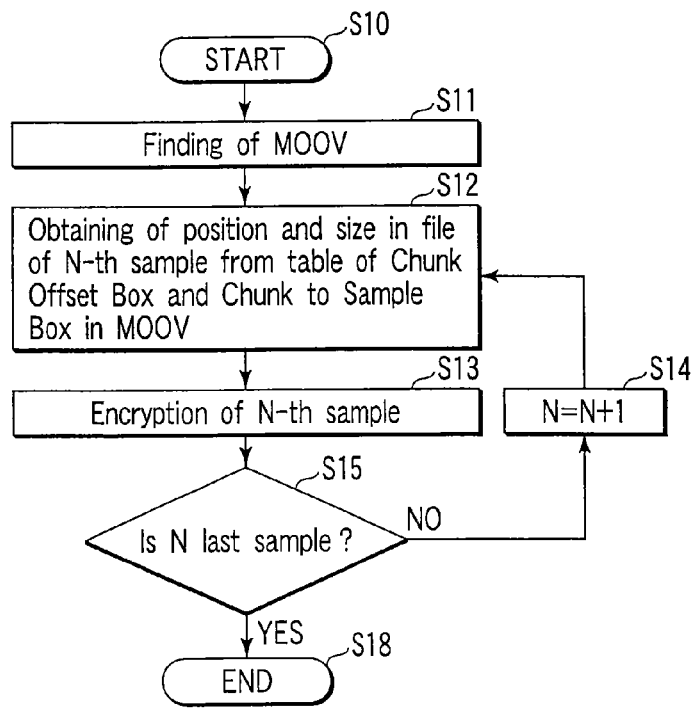
FIGS. 9A and 9B are plan views showing another arrangement structures of a movie box shown in FIG. 1, respectively.
FIG. 12 is a flowchart explaining an encrypting method in the encryption system shown in FIG. 11.

FIG. 8 shows the structure of the movie box 12 referred to as moov (Movie Box). In the box of FIG. 8, only the movie box 12 (Movie Box) equivalent to a data box portion targeted for encryption is shown while the size field, the large size field and the type field not targeted for encryption which are described above with reference to FIGS. 4 to 8 are not shown. Similarly in FIG. 8, mdat is shown as the media data box 13, in which the size field, the type field and the large size field are present and content data (multimedia data) as real data is stored as box data. In the description of FIGS. 8, 9A and 9B, it should be understood that there are a size field, a type field and a large size field.

In a format shown in FIG. 8, one MP4 file is constituted of moov (Movie Box) describing file information as a header of a first layer, and mdat (Media Data Box 13) storing multimedia data containing audio data and video data. In this MP4 file, free as a free space of the first layer, skip and udta (User Data Box) permitting writing defined by a user are additionally disposed.

In the MP4 file, data are generally classified based on units called boxes to be managed. These boxes can take a hierarchical structure from a top layer to a bottom layer, and a box further including a lower layer therein is referred to as a "container box". The boxes described here may be referred to as atoms.

The moov (Movie Box) as the header includes mvhd (Movie Header Box) describing making time of the MP4 file on a second layer and header information such as a content of the MP4 file, and an object, i.e., iods (Object Descriptor Box) describing information regarding a reproduction target and track (Tack Box) describing various parameters regarding multiplexed media information. If there are many multiplexed media, the number of tracks (Track Boxes) corresponding to the number of the media is prepared. For example, in a content multiplexing a sound and a video, an audio media track and a video media track are prepared. A parameter of an audio media is stored in the audio track, and a parameter of a video media is stored in the video track.

As shown in FIG. 8, the track (Track Box) includes tkhd (Track Header Box) storing making time of a track on a third layer and a series of numbers called track ID's (identifiers) for identifying tracks, tref (Track Reference Box) having description regarding a track, edts (Edit Box) regarding edit information, and mdia (Media Box) having description regarding media information. The edit box edts includes elst (Edit List Box) describing edit list information on a fourth layer. The media box mdia includes mdhd (Media Header) storing information regarding a time scale or the like of the media track, hdlr (Handler Reference Box) describing information for reference to the header, and minf (Media Information Box) storing information regarding media on the fourth layer. The media information box minf includes vmhd (Video Media Header Box) indicating that a media stored in a track is a video or smhd (Sound Media Header Box) indicating the a media stored in a track is a sound, hmhd (Hint Media Header Box) describing header information of a hint media, mpeg (MPEG-4 Media Box) describing header information of the MPEG-4 if a media is an MPEG-4 stream other than a video or a sound, minf (Medial Information Box) describing media information, and stbl (Sample Table Box) describing information regarding a sample on a fifth layer. In the video media box vmhd and the sound header box smhd, descriptions are made alternately in accordance with a media stored in the track, i.e., a type: a sound or a video. Further, the dinf (Data Information Box) includes dref (Data Reference Box) describing information for reference to data. The stbl (Sample Table Box) includes stts (Decoding Time to Sample Box) setting decoding time of each sample, ctts (Composition Time to Sample Box) describing indication and time of a sample, stss (Sync Sample Box) describing synchronization information of a sample, stsd (Sample Description Box) setting a type of a codec or a variety of information necessary for decoding, stsz (Sample Size Box) setting the total number of samples in a track (sample_count) and a data size of each sample (entry_size), stsc (Sample to Chunk Box) describing the number of samples in a chunk (sample_per_chunk) and an index of a sample (sample_description_index), stco (Chunk Offset Box) describing offset position information from a head of a file regarding a chunk (chunk_offset), stsh (Shadow Sync Sample Box) describing synchronization information, and stdp (Degradation Priority Box). If necessary, a plurality of stsd (Sample Description Box) can be set.

Figure 10:
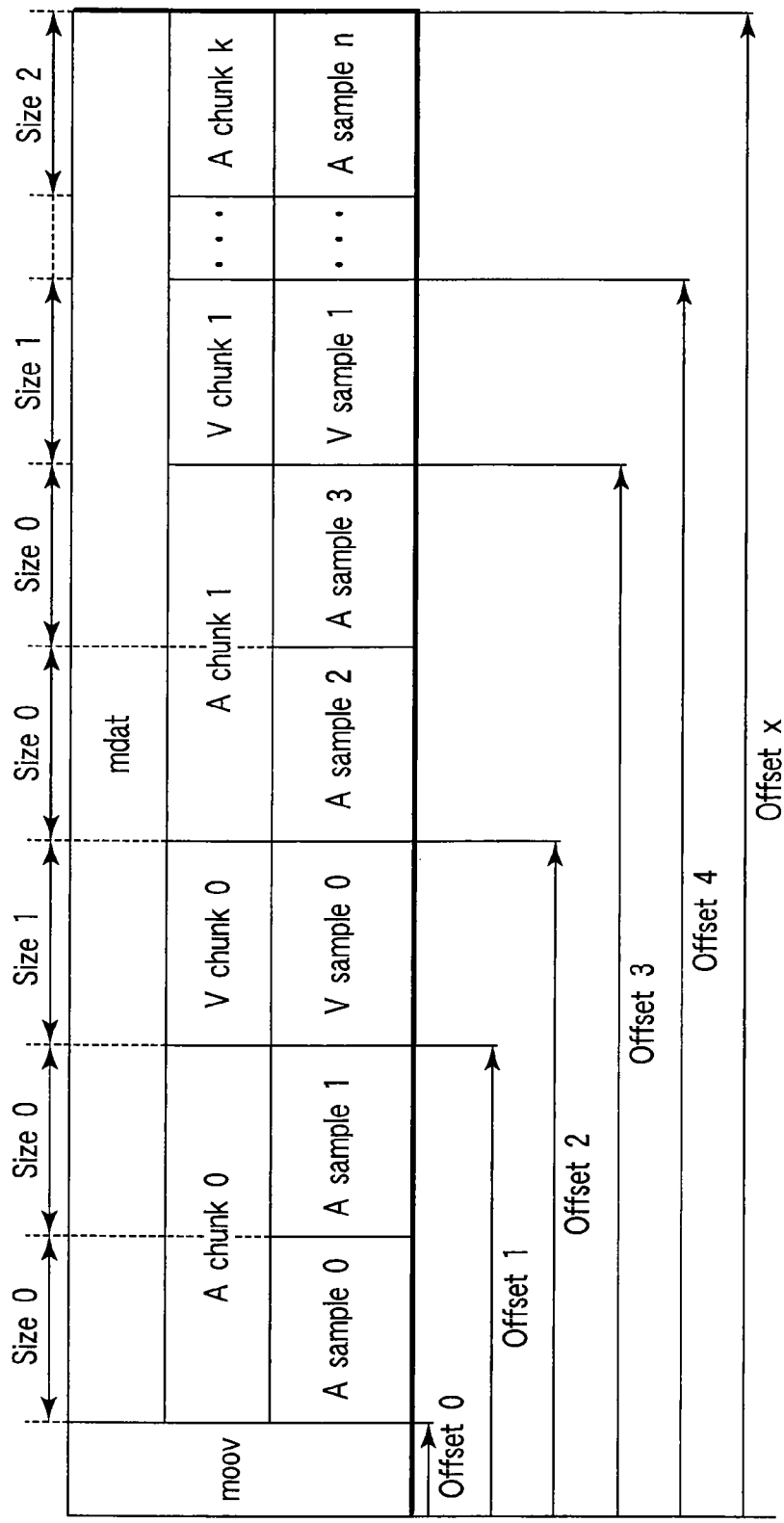
FIG. 10 is a plan view explaining a data structure in the media data box shown in FIG. 1.

In the described case, as shown in FIG. 10, a sample is a unit of certain sizes into which an actual media such as a video or a sound is divided. Media data is managed based on this sample. A chunk is a concatenation of one or a plurality of samples. Information regarding an internal structure of a data area such as a chunk position from the head of the file or the number of samples included in the chunk is described in the lower layer of the moov container box as described above. As described above, the actual media data is arranged in the mdat box, and a box called a track is allocated to information management for each media such as a sound or a video. Thus, in the MP4 file, by obtaining the moov container box, the number of constituting media, types, data sizes etc. can be discovered.

Generally, for the boxes of MP4, there are no rules about an arrangement order on the same layer. On the first layer of FIG. 8, the moov, the mdat, the moof, the free, the skip and the udta are arrayed in this order. However, it does not mean that the boxes must always be arrayed in this order from the head of the file. That is, on the first layer arrangement, the mdat, the moov, the free, the skip and the udta may be arrayed in this order, as shown in FIG. 9A or the moov, the udta, the mdat, the moof, the mdat, the skip and may be arrayed in this order, as shown in FIG. 9A. Furthermore, in the MP4 file, there is provided only one bock of moov but may be provided a plurality of blocks corresponding to mdat and/or moof.

The data in the moov container box excluding the size field, and the type field shown in FIG. 6 or excluding the size field, the type field and the large size field shown in FIG. 7 are encrypted. Similarly, real stream data in the mdat container box excluding the size field, the type field and the large size field are encrypted. The MP4 file may have only one mdat but a plurality of the other boxes corresponding to the mdat and/or moof.

Figure 11:
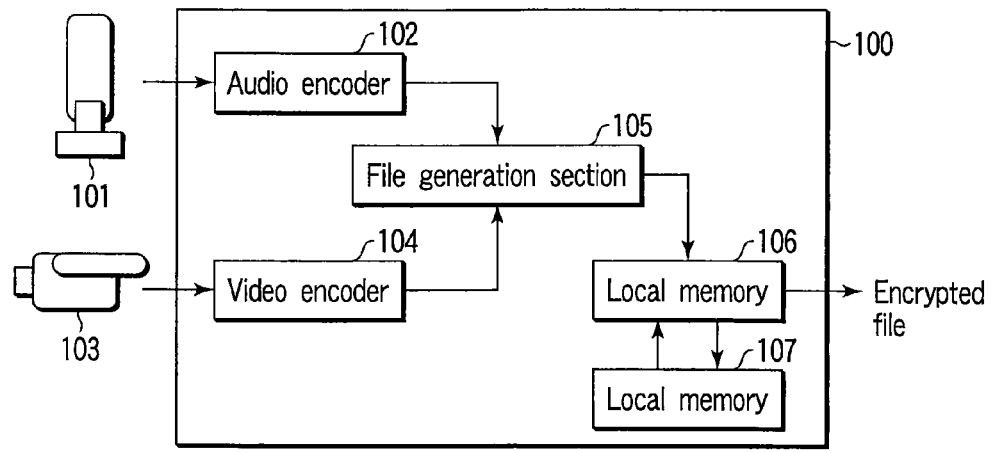
FIG. 11 is a block diagram schematically showing an encryption system of an embodiment of the present invention.

Such encryption is realized by a moving picture recording system 100 similar to that shown in FIG. 11 as an example. In the moving picture recording system 100, audio and video data are encrypted in an order similar to that shown in FIG. 11. Now, a format process including encryption in the moving picture recording system 100 will be described by referring to FIGS. 11 and 12.

An audio signal captured from a microphone 101 or an audio input device, is encoded by an audio encoder 102, and converted into encoded audio data, for example MPEG-4 audio data. Similarly, an audio signal captured from a camera 103 or a video input device, is encoded by a video encoder 104, and converted into encoded video data, for example MPEG-4 video data. Here, both analog and digital signals may be inputted from the microphone 101 and the camera 103 as external input devices to the moving picture recording system 100. From the audio encoder 102, an audio encoded stream generated therein is outputted to a file generation section 105. Similarly, from the video encoder 104, a video encoded stream generated therein is outputted to the file generation section 105. At the file generation section 105, the audio encoded stream and the video encoded stream outputted from the audio encoder 102 and the video encoder 104 are adjusted in a predetermined MP4 file format similar to that shown in FIG. 8, and developed in a local memory 106. After completion of the file generation, as described by referring to FIGS. 12 and 13, at an encryption section 107, the file stored in the local memory 106 is encrypted by a predetermined encrypting method, rearranged in the local memory 106, and outputted as an encrypted file.

Upon a start of encryption (step S10), the movie box 12 (moov) is searched in the MP4 file stored in the local memory 106 as shown in step S11. Here, as the movie box 12 is a top-level box, a size field and a type field are read from the head of the file, and a box having a type field set as moov is searched. If a first box is not moov, seeking is carried out by an amount equal to a read size, and a next box is analyzed. The search is continued until a type field indicated as moov is found.

After the detection of the movie box 12, a chunk offset box (stco), a sample to chunk box (stsc) and a sample size box (stsz) stored for each track in the movie box 12 are searched, and tables held therein are saved in the memory. That is, in step S12, an initial value of N is set to 1, a chunk offset stco of a first chunk described in a first track trak in the movie box 12 is read. An offset address is read from chunk_offset in the chunk offset stco, and all sample sizes belonging to the track are read from entry_size of the sample size box stsz. Additionally, the number of all chunks in the track is read from entry_count in the chunk offset stco, the number of samples of each chunk is read from sample_per_chunk of stsc meaning samples for the chunk box, and the total number of all samples in the track is read from sample_count of the sample size box.

Similarly for other tracks, similar items are read. From these read items, a table describing an offset of each chunk and an offset of each sample in an offset order is made.

That is, as shown in FIG. 10, in the media data stored in the media data box 13 where an audio chunk (A chunk) belonging to the audio track and a video chunk (V chunk) belonging to the video track alternatively appear, a table is made regarding a chunk indicated from an offset 0 to an offset x, and an offset address of each chunk is copied in the table from chunk_offset. In the table, sample items are made in accordance with the number of samples constituting each chunk, and a position and a size of a sample are described from a sample size of the relevant sample. In the table that has been made, the total number of chunks and the total number of samples are checked based on the number of chunks and the number of samples of each track.

Then, by referring to the table, a first sample in the media data box 13 is encrypted to be written in the local memory 106 as shown in step S13. Then, checking is carried out on whether a number N of the encrypted sample is a last sample or not in the media data box 13 in step S13. If the encrypted sample is not a last sample, a sample number to be encrypted is incremented by 1 as shown in step S14. The process returns to step S12 to obtain a position and a size of a sample from the table again, and this sample is encrypted in step S13. The process from step S12 to S15 is repeated and, if the encrypted sample is equivalent to a last sample in the media data box (mdat) 13, the process is finished as shown in step S18.

Figure 13:
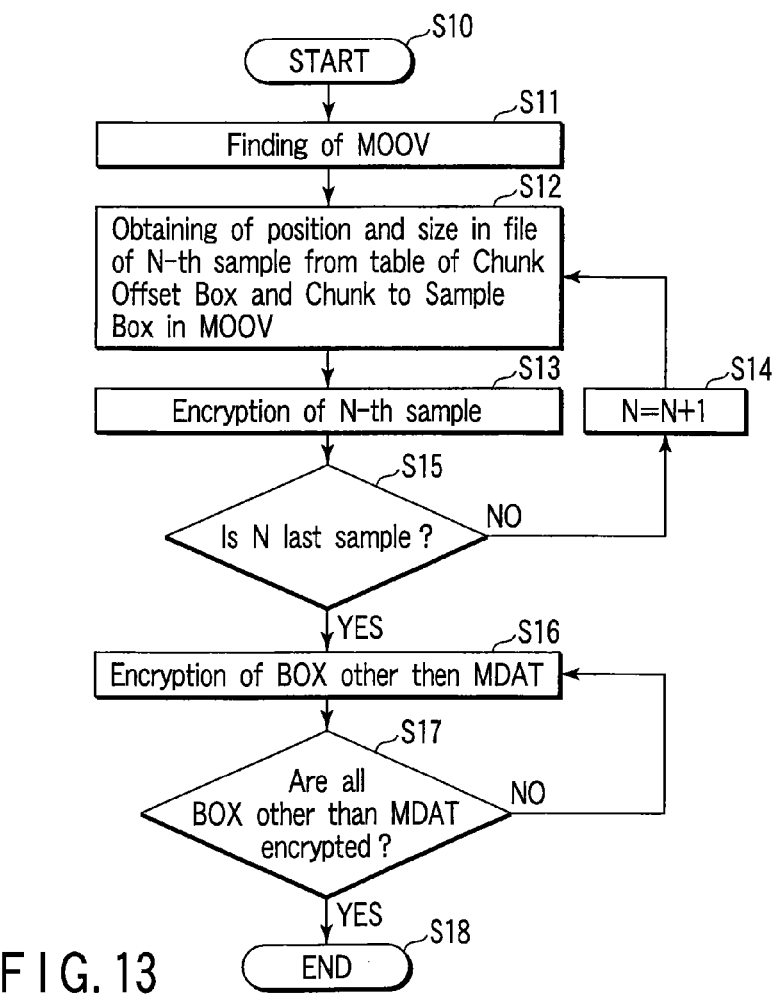
FIG. 13 is another flowchart explaining an encrypting method in the encryption system shown in FIG. 11.

If the other boxes other than the media box 13 are subjected to encryption, the process from step S12 to S15 is repeated, as shown in FIG. 13, in a same manner as that in FIG. 12. If the encrypted sample is equivalent to a last sample in the media data box (mdat) 13, another box is encrypted in step S16 understanding that encryption of real data in the media data box 13 is finished. For example, the movie box 12 (moov) used for encrypting the real data in the media data box 13 is encrypted. Needless to say, none of the size field, the type field and the large size field in the media data box 13 and the movie box 12 (moov) are encrypted as described above.

In step S17, if none of the boxes are encrypted, the process returns to step S16 to sequentially encrypt the boxes in the MP4 file.

In step S17, if encryption of all the boxes is finished, the process is finished as shown in step S18.

In the foregoing description, in the media data box 13, the sample is encrypted for each predetermined block length. If a residual portion is generated, this portion is not encrypted. For example, if a predetermined block length is 8 bytes and a sample has a size of N bytes which is an integral (n) multiple of 8 bytes (N=n×8), the sample is encrypted without any non-encrypted residuals as shown in FIG. 14. On the other hand, if a predetermined block length is 8 bytes and a sample has bytes exceeding the size of the integral (n) multiple of 8 bytes (N=n×8+m, m<8), as shown in FIG. 15, a portion of the sample which is the integral multiple of 8 bytes of the predetermined block length is encrypted while remaining portions (m bytes) are not encrypted. Similarly, if a predetermined block length is 8 bytes and a sample has bytes within the size of the integral (n) multiple of 8 bytes (N<8), as shown in FIG. 16, the sample is not encrypted.

In the encryption process described above with reference to FIG. 13, it is assumed that the MP4 file has been stored in the local memory 106, i.e., file generation has been completed. However, obviously, the encryption process can be executed while the file is generated.

Figure 17:
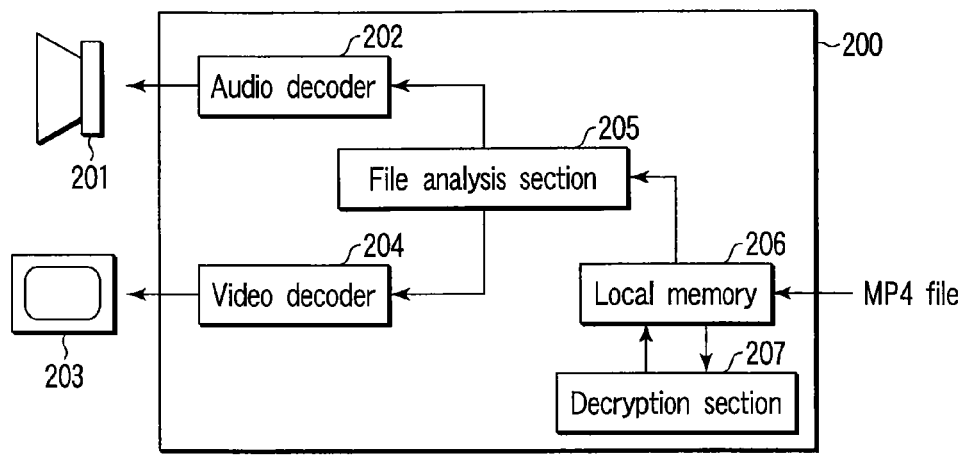
FIG. 17 is a block diagram schematically showing a decryption system of an embodiment of the present invention.

The file containing the encrypted audio and video data is decrypted, for example by a moving picture reproduction system 200 similar to that shown in FIG. 17. The decryption in this moving picture reproduction system 200 is realized by a process shown in FIG. 18. Now, the decryption process in the moving picture reproduction system 200 will be described by referring to FIGS. 17 and 18.

FIG. 17 shows the moving picture reproduction system 200 for decrypting the encrypted audio and video data of the MP4 file and converting the data into audio and video signals. In the moving picture reproduction system 200, the encrypted MP4 file having an encryption data which is encrypted in the process shown in FIG. 13 is inputted to a local memory 206 to be stored therein. As described with reference to FIG. 18, the encrypted file is decrypted by a predetermined decrypting method at a decryption section 207, and rearranged in the local memory 206. The file developed in the local memory is separated into an audio encoded stream and a video encoded stream at a file analysis section 205, which are respectively supplied to an audio decoder 202 and a video decoder 204. The audio decoder 202 decodes the supplied audio encoded stream, and outputs the audio signal to a speaker 201 to be reproduced. The video decoder 204 decodes the supplied video encoded stream, and outputs the video signal to an image output device 203 to display a moving picture thereon.

Figure 18:
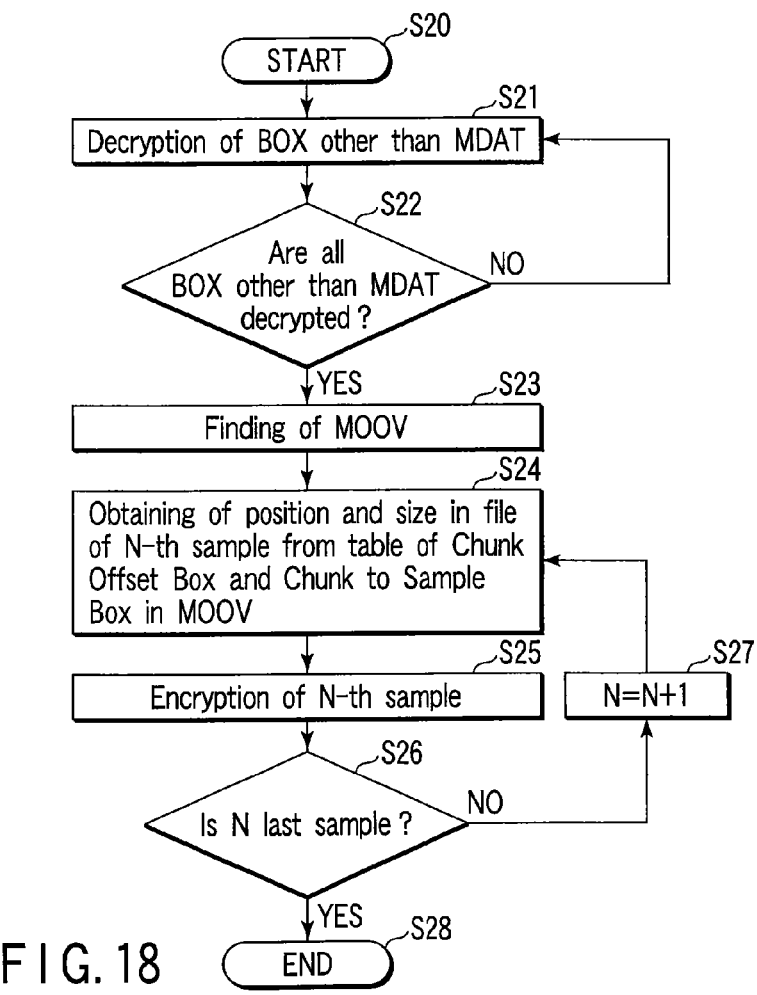
FIG. 18 is a flowchart explaining a decrypting method in the decryption system shown in FIG. 17.

The process of decrypting the encrypted file will be described by referring to FIG. 18. It is assumed herein that the encrypted MP4 file has been stored in the local memory 206 and encrypted for each sample in the media data box 13.

Upon a start of a decryption process (step S20), decryption is carried out for the boxes other than the media data box 13 (mdat) as shown in step S21. As described above with reference to FIGS. 4 to 7, in each box, none of the size field, the type field and the large size field are encrypted. Accordingly, by referring to these fields, the boxes other than the media data box (mdat) 13 are checked, and an encrypted box data portion of each box is decrypted. The decrypted box is stored again in the local memory 206. As shown in step S22, the process is repeated until the decryption of the boxes other than the media data box (mdat) 13 is finished. Upon the end of this processing, the process moves to next processing shown in step S23.

If only the media data box 13 is subjected to encryption and the other boxes are not subjected to encryption, step S23 is started after the start step S20.

In step S23, the decrypted movie box 12 is searched in the file. After the movie box 12 has been searched, as shown in step S24, by a method similar to that of the encryption, a chunk offset box (stco), a sample to chunk box (stsc) and a sample size box (stsz) stored for each track in the movie box 12 are searched, and tables held therein are held in the memory. That is, in step S24, an initial value of N is set to 1, a chunk offset stco of a first chunk described in a first track trak in the movie box 12 is read. An offset address is read from chunk_offset in the chunk offset stco, and all sample sizes belonging to the track are read from entry_size of the sample size box stsz. Additionally, the number of all chunks in the track is read from entry_count in the chunk offset stco, the number of samples of each chunk is read from sample_per_chunk of stsc meaning samples for the sample to chunk box, and the total number of all samples in the track is read from sample_count of the sample size box.

Similarly for other tracks, similar items are read. From these read items, a table describing an offset of each chunk and an offset of each sample in an offset order is made.

That is, as shown in FIG. 10, in the media data stored in the media data box 13 where an audio chunk (A chunk) belonging to the audio track and a video chunk (V chunk) belonging to the video track alternatively appear, a table is made regarding a chunk indicated from an offset 0 to an offset x, and an offset address of each chunk is copied in the table from chunk_offset. In the table, sample items are made in accordance with the number of samples constituting each chunk, and a position and a size of a sample are described from a sample size of the relevant sample. In the table that has been made, the total number of chunks and the total number of samples are checked based on the number of chunks and the number of samples of each track.

Then, by referring to the table, a first sample is decrypted to be written in the local memory 206 as shown in step S25. Then, checking is carried out on whether a number N of the decrypted sample is a last sample or not in the media data box 13 in step S26. If the decrypted sample is not a last sample, a sample number to be decrypted is incremented by 1 as shown in step S27. As shown in step S24, the process returns to the step of obtaining a position and a size of a sample from the table again, and this sample is decrypted in step S25. The process from step S24 to S27 is repeated and, if the decrypted sample is equivalent to a last sample in the media data box (mdat) 13, decryption of real data in the media data box 13 is finished.

As a modified example of the foregoing embodiment, an offset of each sample may be obtained by referring to the movie fragment box. That is, in the MP4 file where the movie fragment box is present, track fragment run box which has similar function as a chunk offset box (stco) and a sample size box (stsz) is described in the movie fragment box. Thus, an offset of each sample can be similarly obtained by analyzing the chunk offset stco and the sample size stsz.

In the foregoing embodiment, the data in the sample is encrypted by using the offset value and the size of the sample. Since the sample is a minimum unit necessary for decoding the encoded stream, if access can be made to the sample unit, it is possible to efficiently access a sample in an optional position in the aforementioned special reproduction. That is, in the process shown in FIG. 13, steps S10 to S12 are carried out. In step S12, if an N-th sample is a target sample, only the target sample is decrypted. This decrypted sample is decoded into an audio or video signal to be reproduced. By the reproduction of only the target sample, in moving picture reproduction, for example, fast-forward reproduction, rewind reproduction, random access reproduction, and resume reproduction, i.e., reproduction is resumed from where the reproduction is stopped by the user, are realized. Similar reproduction is enabled for a sound.

In the foregoing embodiment, encryption is carried out for each sample in the media data box 13. In place of the encryption for each sample, the data in the chunk maybe encrypted for each chunk. As described above, the chunk is a collection of the continuous samples of the same media in the media data. Encryption for each chunk is only necessary as in the case of the encryption for each sample unit. In this encryption for each chunk, since the number of times of resetting encryption is reduced compared with the encryption for each sample, the process of encryption and decryption can be reduced. In the encryption and the decryption for each chunk, in FIGS. 11 and 16, by processing collected chunk information, chunk encryption and description are enabled as in the case of the sample.

The encrypting method and the decrypting method of the present invention can be applied to equipments for storing the MP4 file format such as a mobile phone, a digital camera, a digital movie cam-coder, a digital hard disk recorder, PDA (Personal Digital Assistant) etc.

Further, even in a JPEG 2000 file format using a similar box structure, the encrypting method and the decrypting method of the present invention can be applied.

As described above, according to the embodiment of the present invention, by carrying out encryption for each box, it is possible to efficiently access an optional box present in the MP4 data. Moreover, by carrying out encryption for data other than the size field and the type field, it is possible to access a desired box without any decryption using the size field and the type field which are plaintexts.

Furthermore, according to the embodiment of the present invention, it is possible to access a box including audio or moving picture encoded data, efficiently access a sample or a chunk in the box, and realize special audio or moving picture reproduction.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general invention concept as defined by the appended claims and their equivalents.

What is claimed is:

1. A method for decrypting a multimedia file defined in MPEG-4 file format and its derived file format, the multimedia file including attribution information and a sequential array of chunks, each of the chunks including at least one of encoded audio frames or encoded video frames, the encoded audio frames or the encoded video frames being encrypted, the method comprising:
   obtaining chunk offset information from the attribution information in the multimedia file, wherein the chunk offset information indicates respective start positions of the chunks from a head of the file;
   referring to one of the start positions of the chunks, and extracting the chunks from the multimedia file based on the one of the start positions of the chunks;
   decrypting the one of the encrypted audio frames or the encrypted video frames in the extracted chunks into one of the encoded audio frames or the encoded video frames with referring to the one of the start positions of the chunks.

2. The method according to claim 1, wherein the multimedia file includes a first box and a second box, the attribution information is contained in the first box and the chunks are contained in the second box.

3. The method according to claim 1, wherein the encrypted audio frames are successively decrypted into the encoded audio frames and/or the encrypted video frames are successively decrypted into the encoded video frames.

4. The method according to claim 3, further comprising:
converting an audio stream extracted from the encoded audio frames into audio signals and/or a video stream extracted from the encoded video frames into a video signal.

5. A method for decrypting a multimedia file defined in MPEG-4 file format and its derived file format, the multimedia file including attribution information and a sequential array of chunks, each of the chunks including at least one of samples, each of the samples including an encoded audio frame or encoded video frame, the encoded audio frame or the encoded video frame being encrypted, the method comprising:
  obtaining first offset information and sample information from the attribution information in the multimedia file, wherein the first offset information indicates respective start positions of the chunks from a head of the file, and the sample information indicates the number of samples and respective sample sizes of the samples in each of the chunks;
  calculating second offset information from the first offset information and the sample information, wherein the second offset information indicates respective start positions of the samples;
  referring to one of the start positions of the chunks, and extracting one of the samples from the multimedia file based on the one of the start positions of the samples;
  decrypting the encrypted audio frame or the encrypted video frame in the extracted sample into the encoded audio frame or the encoded video frame with referring to the one of the start positions of the samples.

6. The method according to claim 5, wherein the multimedia file includes a first box and a second box, the attribution information is contained in the first box and the samples are contained in the second box.

7. The method according to claim 5, wherein the encrypted audio frames are successively decrypted into the encoded audio and/or the encrypted video frames are successively decrypted into the encoded video frames.

8. The method according to claim 7, further comprising:
converting an audio stream extracted from the encoded audio frames into audio signals and/or a video stream extracted from the encoded video frames into a video signal.

* * * * *